US005765679A

United States Patent [19]

Greive

[11] Patent Number: 5,765,679
[45] Date of Patent: Jun. 16, 1998

[54] PAPER TRANSPORT SYSTEM

[75] Inventor: Martin Greive, Heidelberg, Germany

[73] Assignee: Heidelberger Druckmaschinen AG, Heidelberg, Germany

[21] Appl. No.: 566,549

[22] Filed: Dec. 4, 1995

[30] Foreign Application Priority Data

Dec. 2, 1994 [DE] Germany .......................... 44 42 982.7

[51] Int. Cl.[6] .................................................. B65G 15/34

[52] U.S. Cl. .......................... 198/834; 198/847; 271/198; 271/275

[58] Field of Search .................................. 198/834, 847; 271/275, 198, 94

[56] References Cited

U.S. PATENT DOCUMENTS

| | | | |
|---|---|---|---|
| 1,843,208 | 2/1932 | Cutler | 198/834 |
| 2,129,337 | 9/1938 | Spears | 198/834 |
| 3,917,092 | 11/1975 | McGinnis | 198/834 |
| 4,289,230 | 9/1981 | McGee . | |
| 5,199,552 | 4/1993 | Dauchez . | |
| 5,320,214 | 6/1994 | Kordis . | |

FOREIGN PATENT DOCUMENTS

| | | | |
|---|---|---|---|
| 0 072 466 | 3/1985 | European Pat. Off. . | |
| 27 40 807 | 3/1978 | Germany . | |
| 39 00 341 | 7/1990 | Germany . | |
| 405338843A | 12/1993 | Japan | 271/198 |
| 406024598A | 2/1994 | Japan | 271/198 |
| 1 561 965 | 3/1980 | United Kingdom . | |
| 28 17 958 | 5/1987 | United Kingdom . | |

OTHER PUBLICATIONS

Continental Transportband–Dienst Publ. No. 4, Mar. 59 (Müer), pp. 1–9, "Über den Geradelauf des Föder . . . ".

*Primary Examiner*—William E. Terrell
*Assistant Examiner*—Khoi H. Tran
*Attorney, Agent, or Firm*—Herbert L. Lerner; Laurence A. Greenberg

[57] ABSTRACT

Paper transport system for printing presses includes a drive roller, a deflection drum disposed in spaced relationship with the drive roller, and a conveyor belt extending around the drive roller and the deflection drum, the conveyor belt having first regions formed with engagement elements, as well as second and substantially smooth-surfaced regions, the drive roller and the deflection drum, respectively, being subdivided into axially separate, respective roller and drum segments rotatable independently of one another and surrounded by the first and the second regions of the conveyor belt, the conveyor belt being of such construction between the first regions and the second regions thereof that small relative movements are possible therebetween in a longitudinal direction of the conveyor belt.

6 Claims, 5 Drawing Sheets

PAPER TRANSPORT SYSTEM

BACKGROUND OF THE INVENTION

Field of the Invention

The invention relates to a paper transport system and, more particularly, such a paper transport system for printing presses having a drive roller, a deflection drum disposed in spaced relationship from the drive roller, and a conveyor belt extending around the drive roller and the deflection drum, the conveyor belt having both regions with engagement elements and substantially smooth-surfaced regions.

For transporting sheets of paper between the various stations of a printing press, conveyor belts have heretofore been provided which are formed of relatively simple, broad endless belts and which revolve around drive rollers and deflection rollers. Because such smooth-surfaced belts are subject to a given slippage, they are not synchronous with the printing-press run or operation. If a precise instant of transfer to a next station is important, the transport belts must then be synchronized accordingly. To that end, the invention of the instant application has provided for relatively simple single machine belts with engagement locations or catches for drive-side toothings, thereby resulting in transport devices of the type described at the introduction hereto.

It has been found, however, that such belts are unable to meet the very high demands for transfer accuracy which have arisen over the course of recent developments in printing presses.

SUMMARY OF THE INVENTION

It is accordingly an object of the invention to provide a paper transport system for printing presses wherein transport of the paper proceeds in utmost synchronism with the drive of the printing press.

With the foregoing and other objects in view, there is provided, in accordance with the invention, 1. Paper transport system for printing presses, comprising a drive roller, a deflection drum disposed in spaced relationship with the drive roller, and a conveyor belt extending around the drive roller and the deflection drum, the conveyor belt having first regions formed with engagement elements, as well as second and substantially smooth-surfaced regions, the drive roller and the deflection drum, respectively, being subdivided into axially separate, respective roller and drum segments rotatable independently of one another and journaled by the first and the second regions of the conveyor belt, the conveyor belt being of such construction between the first regions and the second regions thereof that small relative movements are possible therebetween in a longitudinal direction of the conveyor belt.

In accordance with another feature of the invention, the conveyor belt, between the first and the second regions, is formed with a multiplicity of recesses distributed in the longitudinal direction of the conveyor belt.

In accordance with a further feature of the invention, the recesses are formed as slits extending crosswise to the longitudinal direction of the conveyor belt.

In accordance with an added feature of the invention, each of the drive roller and the deflection roller has a respective shaft, a pair of the roller segments of the drive roller and a pair of the drum segments of the deflection drum being formed as toothed disks disposed at respective sides of the drive roller and the deflection drum and secured on the respective shafts, and another of the roller segments of the drive roller and another of the drum segments of the deflection drum being formed as freely rotatably supported respective roller and drum bodies on the respective shafts and between the respective toothed disks of the drive roller and the deflection drum, the toothed disks of each of the drive roller and deflection drum and the freely rotatable roller and drum bodies respectively associated therewith having substantially the same diameter.

In accordance with an additional feature of the invention, at least one of the freely rotatable respective roller and drum bodies of the drive roller and the deflection roller has one of a concave and convex jacket surface.

In accordance with yet a further feature of the invention, at least one of the deflection drum and the drive roller is supported so as to be pivotable about a pivot disposed in a plane passing through a longitudinally extending center line of the conveyor belt.

In accordance with yet an added feature of the invention, the conveyor belt is formed of a flat machine belt and two toothed belts connected laterally thereto, the machine belt being formed with the first regions of the conveyor belt, and the toothed belts being formed with the second regions of the conveyor belt.

In accordance with a concomitant feature of the invention, the machine belt and the toothed belts are joined together so that tension strands in the toothed belts are located at the same level as that of a neutral grain of the machine belt.

The invention is thus based on the recognition that errors of synchronism result not only from slippage of the machine belt but also from tolerances which occur, for example, during manufacture or due to wear of the engagement elements, and because they are unavoidable make absolutely synchronized travel of these belts impossible. Due to the partial decoupling of the various conveyor belt regions as provided in accordance with the invention, the engagement regions and the smooth-surface regions advantageously cooperate, so that paper transported on the smooth-surfaced regions moving in a straight line can be delivered with maximum precision.

The mobility between the regions having engagement elements and the substantially smooth-surfaced regions of the conveyor belt can be produced by any sort of elastic means therebetween, such as a material having a lower modulus of elasticity and a thinner material, respectively, than in the other regions of the conveyor belt.

The desired elasticity can be achieved in an especially simple manner by providing that the conveyor belt, between the regions having engagement elements and the substantially smooth-surfaced regions, have a multiplicity of recesses which are distributed in the longitudinal direction of the conveyor belt. The elasticity properties thus, moreover, become very accurately reproducible and can be kept very constant along the conveyor belt.

If the recesses are slits which extend crosswise or transversely to the longitudinal direction of the conveyor belt, the remaining webs or strips between these recesses permit relative motion between belt segments with a minimum sacrifice of usable sheet-transporting surface area.

In a preferred embodiment, the axially separate drum segments are formed by providing the drive roller and the deflection drum with two lateral toothed disks, respectively, secured on a respective shaft, and one freely rotatably supported roller and drum body, respectively, between the toothed disks, the toothed disks and the respective associated roller or drum body having substantially the same diameter.

If the deflection drum and/or the drive roller is supported so as to be pivotable about a pivot disposed in a plane passing through a longitudinally extending center line of the conveyor belt, the respective drum and roller can adapt to the belt tension, and the belt can center itself and run in a stable path.

To further stabilize belt travel, in the preferred embodiment, the freely rotatably supported drum body of the deflection drum has a concave jacket surface. Depending upon the type and dimensions of the belt, it may be expedient for the jacket surface of the drive roller to be formed concave as well, or convex jacket surfaces may be used instead.

In the interest of effecting simple and economical manufacture, the conveyor belt is preferably formed of conventional components, namely a flat machine belt and two toothed belts joined laterally thereto, the machine belt being formed with the substantially smooth-surfaced regions of the conveyor belt, and the toothed belts being formed with the regions of the conveyor belt having engagement elements. To minimize any possible errors in synchronism from the very outset, the machine belt and the toothed belts should be joined together so that tension strands of the toothed belts are located at the same level as that of neutral grains or fibers of the machine belt.

Other features which are considered as characteristic for the invention are set forth in the appended claims.

Although the invention is illustrated and described herein as embodied in a paper transport system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1A:
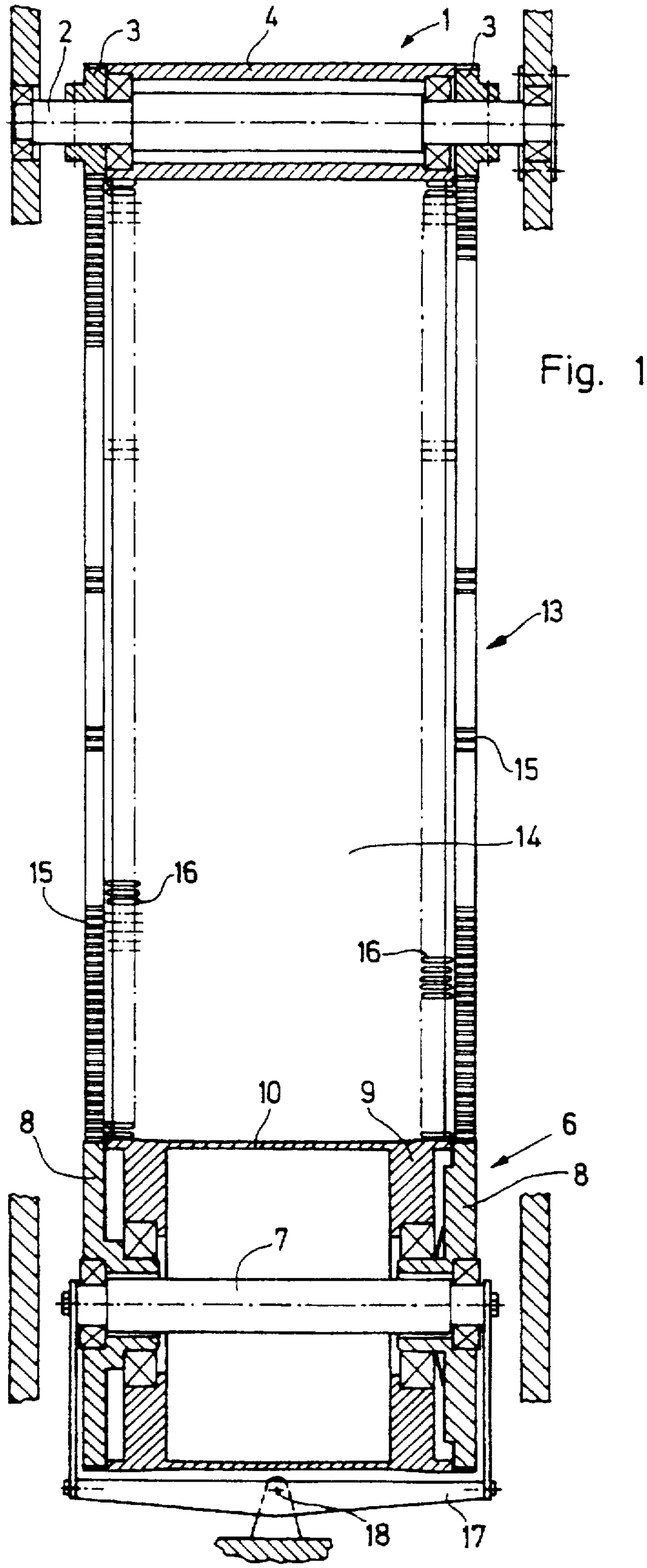
FIG. 1*a* is a horizontal sectional view of the paper transport system according to the invention.
Figure 1B:
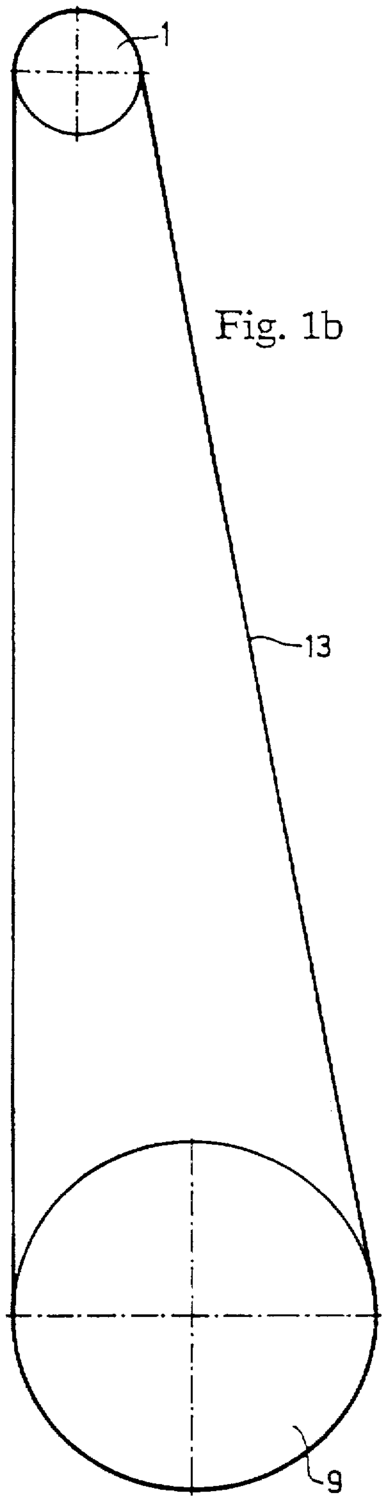
FIG. 1*b* is a highly diagrammatic side elevational view of FIG. 1*a*.
Figure 2:
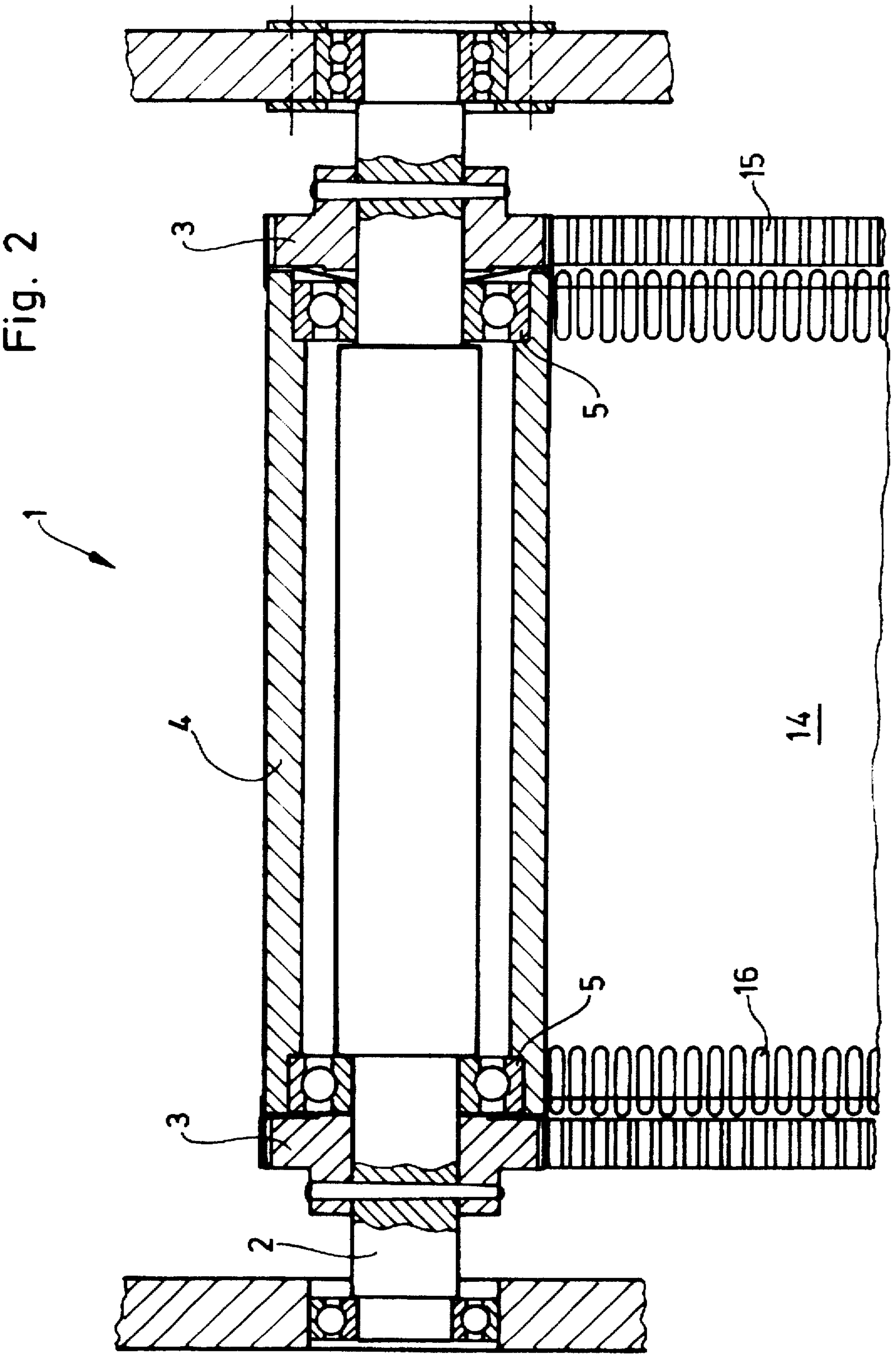
FIG. 2, an enlarged elevation view of the drive roller of the paper transport system of FIG. 1.

Referring now to the drawings and, first, particularly to FIGS. 1*a* and 1*b* thereof, there is shown therein a drive roller 1, which is also shown enlarged and in greater detail in FIG. 2, including a drive shaft 2 mounted on and being driven from a machine-side of a printing press. Two toothed disks 3 axially spaced from one another and, respectively, formed with outer toothing for toothed belts are secured on the drive shaft 2. Extending between the two toothed disks 3 is a cylindrical drum 4 having virtually exactly the same diameter as that of the toothed disks 3. The drum 4 is rotatably supported on the drive shaft 2 by means of two separate bearings 5, so that it is rotatable counter to the toothed disks 3.

Figure 3:
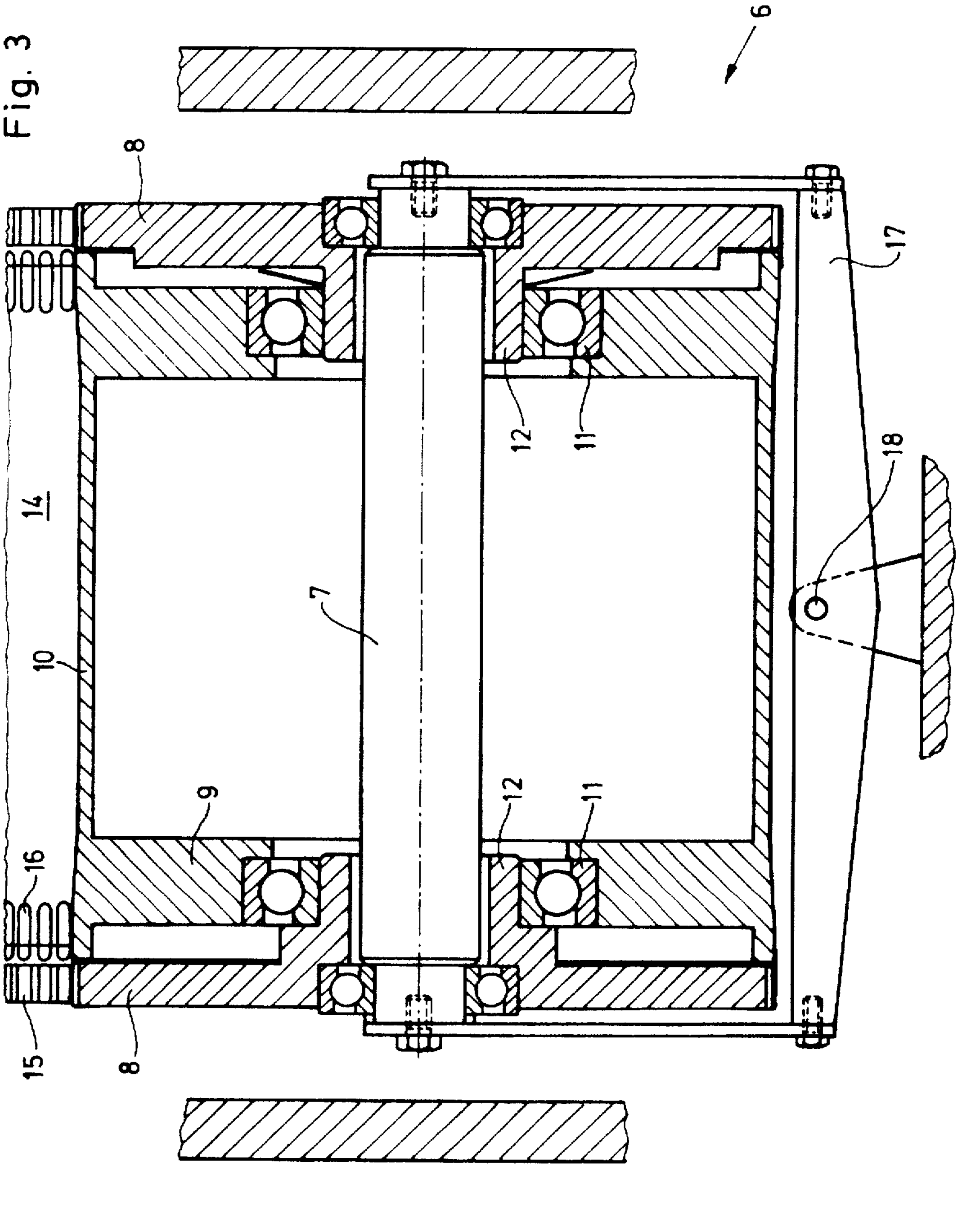
FIGS. 3 and 3*a*, are enlarged elevation views of the deflection drum of the paper transport system of FIG. 1.
Figure 3A:
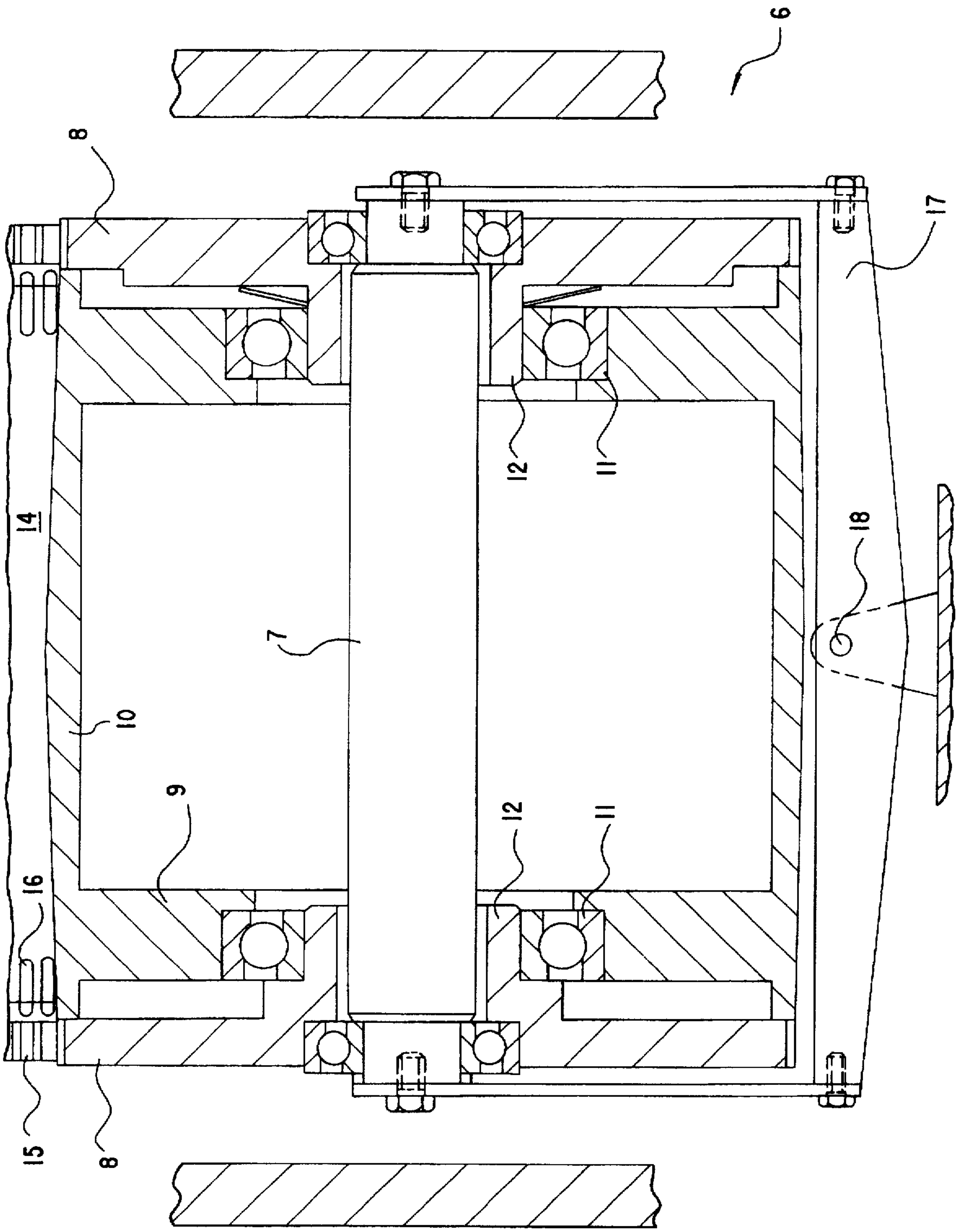

A deflection or deviation drum 6 shown in FIG. 1*a* and also enlarged and in greater detail in FIG. 3, includes a deflection shaft 7, which is disposed parallel to and spaced from the drive shaft 2. At the same axial spacing as the toothed disks 3 of the drive shaft 2, two toothed disks 8 of larger diameter than the toothed disks 3 are rotatably supported on the deflection shaft 7. Extending between the two toothed disks 8 is a drum 9 having, at the axial ends thereof, virtually exactly the same diameter as that of the toothed disks 8, and a somewhat smaller diameter towards the center thereof, which results in a jacket face 10 of the drum 9 having a slightly concave or convex cross section as shown in FIGS. 3 and 3*a*. The drum 9 is rotatably supported by two separate bearings 11 on two hollow journal pins 12 cast on the toothed disks 8, as shown more clearly in FIG. 3, and projecting inwardly from the toothed disks 8 without being in contact with the deflection shaft 7.

Extending around the drive roller 1 and the deflection drum 6 is an endless conveyor belt 13, which is as wide as the drive roller 1 and the deflection drum 6 and, as represented in FIG. 1*b*, forming two very long straight segments therebetween. One of the two straight segments of the conveyor belt 13 points is directed upwardly in the printing press, so that, by rotating the drive shaft 2, non-illustrated sheets of paper can be transported for a considerable distance on the conveyor belt 13.

The conveyor belt 13 is subdivided, in the direction of the width or breadth thereof, into a middle region formed by a smooth-surfaced machine belt 14, and two edge regions, respectively, formed by toothed belts 15. The machine belt 14 lies on the drive roller 1 and the deflection drum 6, on the respective separately rotatable drums 4 and 9 thereof, while the toothed belts 15 lie on the toothed disks 3 and 8, respectively, of the drive roller 1 and the deflection drum 6. Adjacent to the two toothed belts 15, the machine belt 14 is formed with a multiplicity of recesses 16, which are distributed at regular intervals along the length thereof. The recesses 16 are formed as slits which extend crosswise to the longitudinal direction of the conveyor belt 13 or machine belt 14 but are considerably shorter than the machine belt 14 is wide, so that the width of the machine belt 14 which is available for transporting the paper is not too restricted.

The deflection shaft 7 of the deflection drum 6 is held at its ends in a U-shaped bracket 17 which embraces the deflection drum 6. The bracket 17 is supported at its base in a pivot or center of rotation 18, so that it can swivel thereabout in the plane of the drawing of FIG. 1 or FIG. 3. The pivot 18 is located in a plane which passes vertically through an imaginary center line of the conveyor belt 13 in the longitudinal direction thereof. The pivot 18 is also stationary with respect to the printing press, as is indicated in FIGS. 1 and 3, so that the conveyor belt 13 is held taut.

Figure 4:
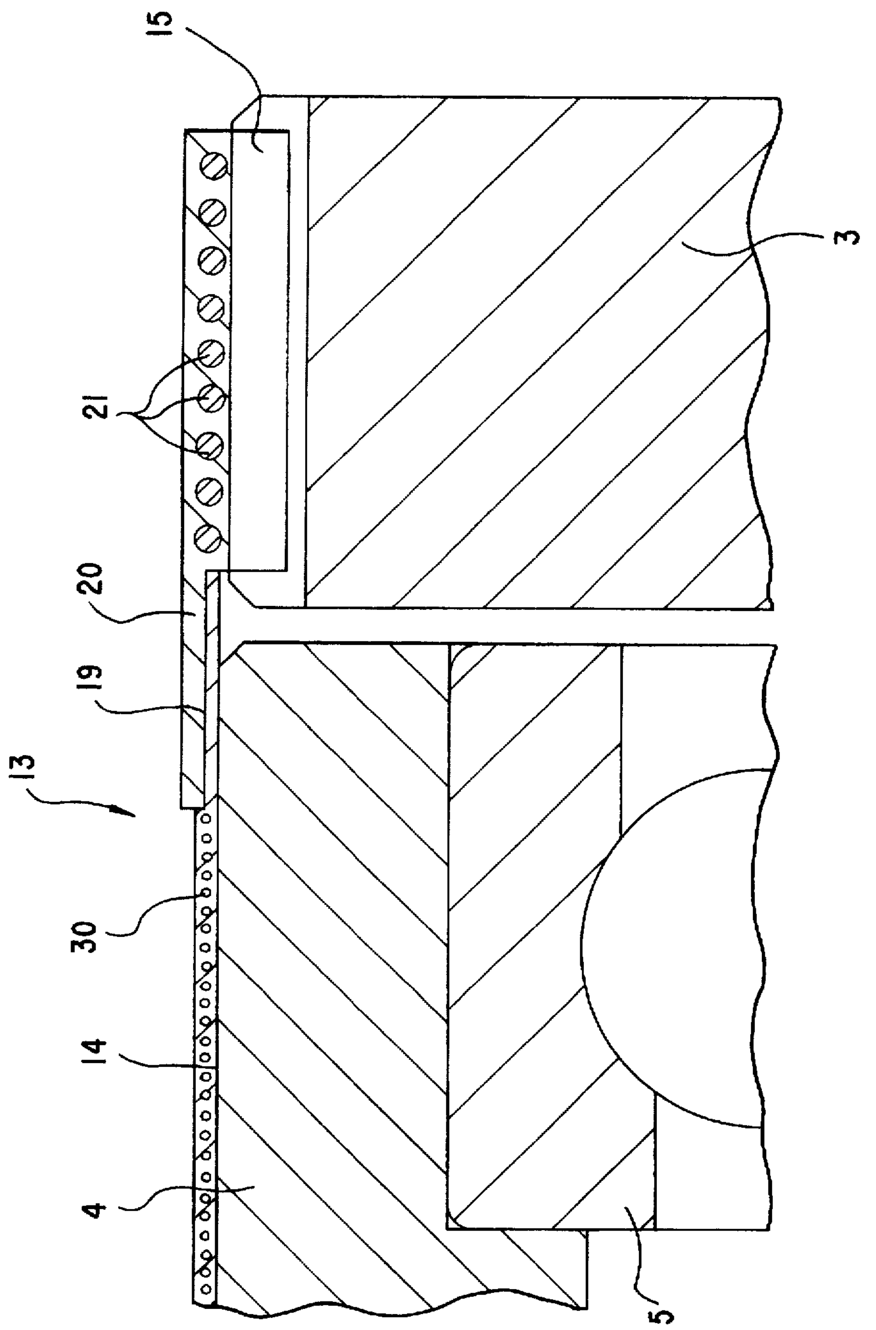
FIG. 4, a highly enlarged sectional view of a portion of a conveyor belt resting on the drive roller.

FIG. 4 shows how the machine belt 14 is connected to the toothed belts 15. The machine belt 14 is formed with a reduced thickness at an edge 19 thereof, and the toothed belt 15 has a projection or extension 20, which is placed over the edge 19 and secured there, for example, by adhesive bonding. The reduction in thickness at the edge 19 of the machine belt 13, and the location of the extension 20 of the toothed belt 15 are such that tension strands 21 extending longitudinally in the toothed belt 15 are located as precisely as possible at the level of the neutral grain or fibers 30 of the machine belt 14.

As an alternative to the multipartite construction shown in FIG. 4, however, the conveyor belt 13 may also be formed in one piece.

An effect of the herein-aforedescribed transport system is that the conveyor belt 13, over the straight stretch between the drive roller 1 and the deflection roller 6, travels practically absolutely synchronously with the drive roller 1, so that paper can be transported with an accuracy within only a few microns. Slippage of the machine belt 14 relative to the drive roller 1 has no effect upon the portion of the belt which is traveling straight ahead. Relative motions between the toothed belts 15 and the machine belt 14, which inevitably occur due to tolerances, are compensated for by the rotatably supported drums 4 and 9 and by the relatively elastic connection of the toothed belts 15 to the machine belt 14.

As a result of the pivotable or swivelable support of the deflection drum 6, the conveyor belt 13 can center itself and travel along a stable path. The same effect occurs if the pivot 18 is not located to the outside of the deflection drum 6 and drive roller 1 as shown in FIG. 1, but rather between them.

I claim:

1. Paper transport system for printing presses, comprising:

a drive roller, a deflection drum disposed in spaced relationship with said drive roller, a conveyor belt extending around said drive roller and said deflection drum, said conveyor belt having first regions formed with engagement elements, as well as second and substantially smooth-surfaced regions, said conveyor belt formed of a flat machine belt and two toothed belts connected laterally thereto, said machine belt formed with said second regions of said conveyor belt, and said toothed belts formed with said first regions of said conveyor belt, said machine belt and said toothed belts are joined together so that tension strands in said toothed belts are located at the same level as that of fibers of said machine belt, and said drive roller and said deflection drum, respectively, being subdivided into axially separate, respective roller and drum segments rotatable independently of one another and journaled by said first and said second regions of said conveyor belt, said conveyor belt being of such construction between said first regions and said second regions thereof that small relative movements are possible therebetween in a longitudinal direction of said conveyor belt.

2. Paper transport system according to claim 1, wherein said conveyor belt, between said first and said second regions, is formed with a multiplicity of recesses distributed along said longitudinal direction of said conveyor belt.

3. Paper transport system according to claim 1, wherein each of said drive roller and said deflection roller has a respective shaft, and wherein a pair of said roller segments of said drive roller and a pair of said drum segments of said deflection drum are formed as toothed disks disposed at respective sides of said drive roller and said deflection drum and secured on the respective shafts, and another of said roller segments of said drive roller and another of said drum segments of said deflection drum are formed as freely rotatably supported respective roller and drum bodies on the respective shafts and between the respective toothed disks of said drive roller and said deflection drum, said toothed disks of each of said drive roller and deflection drum and said freely rotatable roller and drum bodies respectively associated therewith having substantially the same diameter.

4. Paper transport system according to claim 3, wherein at least one of said freely rotatable respective roller and drum bodies of said drive roller and said deflection roller has one of a concave and convex jacket surface.

5. Paper transport system according to claim 1, wherein at least one of said deflection drum and said drive roller is supported so as to be pivotable about a pivot disposed in a plane passing through a longitudinally extending center line of said conveyor belt.

6. Paper transport system for printing presses, comprising:

a drive roller, a deflection drum disposed in spaced relationship with said drive roller, a conveyor belt extending around said drive roller and said deflection drum, said conveyor belt having first regions formed with engagement elements, as well as second and substantially smooth-surfaced regions, said conveyor belt, between said first and said second regions, is formed with a multiplicity of recesses distributed along said longitudinal direction of said conveyor belt, said recesses are formed as slits extending crosswise to said longitudinal direction of said conveyor belt, and said drive roller and said deflection drum, respectively, being subdivided into axially separate, respective roller and drum segments rotatable independently of one another and journaled by said first and said second regions of said conveyor belt, said conveyor belt being of such construction between said first regions and said second regions thereof that small relative movements are possible therebetween in a longitudinal direction of said conveyor belt.

* * * * *